(12) United States Patent
Ama et al.

(10) Patent No.: US 7,725,728 B2
(45) Date of Patent: May 25, 2010

(54) APPARATUS AND METHOD FOR DYNAMICALLY AUDITING DATA MIGRATION TO PRODUCE METADATA

(75) Inventors: Ronaldo Ama, Palo Alto, CA (US); Sachinder S. Chawla, Palo Alto, CA (US); Balaji Gadhiraju, Cupertino, CA (US); Awez Syed, San Jose, CA (US); Mark Todd, Rickmansworth (GB); Mon For Yee, San Francisco, CA (US)

(73) Assignee: Business Objects Data Integration, Inc., San Jose, CA (US)

( * ) Notice: Subject to any disclaimer, the term of this patent is extended or adjusted under 35 U.S.C. 154(b) by 1238 days.

(21) Appl. No.: 11/088,520

(22) Filed: Mar. 23, 2005

(65) Prior Publication Data

US 2006/0218405 A1 Sep. 28, 2006

(51) Int. Cl.
H04L 9/32 (2006.01)

(52) U.S. Cl. ............................. 713/181; 726/20; 726/22
(58) Field of Classification Search ................. 713/181; 726/20, 22, 23, 25, 34, 36

See application file for complete search history.

(56) References Cited

U.S. PATENT DOCUMENTS

| | | | | |
|---|---|---|---|---|
| 5,369,570 A | * | 11/1994 | Parad | 705/8 |
| 5,566,332 A | * | 10/1996 | Adair et al. | 707/101 |
| 5,813,009 A | * | 9/1998 | Johnson et al. | 707/100 |
| 6,151,608 A | * | 11/2000 | Abrams | 707/204 |
| 6,167,405 A | * | 12/2000 | Rosensteel et al. | 707/102 |
| 6,370,646 B1 | * | 4/2002 | Goodman et al. | 713/100 |
| 6,377,952 B1 | * | 4/2002 | Inohara et al. | 707/101 |
| 6,438,538 B1 | * | 8/2002 | Goldring | 707/3 |
| 6,542,905 B1 | * | 4/2003 | Fogel et al. | 707/200 |
| 6,546,404 B1 | * | 4/2003 | Davis et al. | 707/204 |
| 6,567,823 B1 | * | 5/2003 | Rothschild | 707/104.1 |
| 6,615,217 B2 | * | 9/2003 | Rosensteel et al. | 707/101 |
| 6,636,861 B1 | * | 10/2003 | Stack | 707/101 |
| 6,714,979 B1 | * | 3/2004 | Brandt et al. | 709/225 |
| 6,718,435 B2 | * | 4/2004 | Riedle | 711/114 |
| 6,804,689 B1 | * | 10/2004 | Havrda et al. | 707/204 |
| 6,901,418 B2 | * | 5/2005 | Gonos | 707/204 |
| 6,912,539 B1 | * | 6/2005 | Kapitanski et al. | 707/101 |
| 6,915,287 B1 | * | 7/2005 | Felsted et al. | 707/1 |
| 6,938,058 B2 | * | 8/2005 | Henrickson et al. | 707/204 |
| 6,957,227 B2 | * | 10/2005 | Fogel et al. | 707/102 |
| 7,058,615 B2 | * | 6/2006 | Yao | 706/12 |
| 7,092,950 B2 | * | 8/2006 | Wong et al. | 707/100 |
| 7,092,968 B1 | * | 8/2006 | Ebel et al. | 707/104.1 |

(Continued)

OTHER PUBLICATIONS

BusinessObjects Enterprise 6, Integrated Business Intelligence, Products and Services Overview, 2003.*

(Continued)

*Primary Examiner*—David García Cervetti
(74) *Attorney, Agent, or Firm*—Cooley Godward Kronish LLP

(57) ABSTRACT

A computer readable medium includes executable instructions to audit data migration. The executable instructions include instructions to define a data migration path from a source to a target. Audit points are specified within the data migration path. Audit statistics to be generated at the audit points are identified. The audit statistics including data corresponding to individual data values transmitted over the data migration path. Audit rules to be applied against the audit statistics are established.

18 Claims, 11 Drawing Sheets

U.S. PATENT DOCUMENTS

| | | | | |
|---|---|---|---|---|
| 7,103,597 | B2* | 9/2006 | McGoveran | 707/8 |
| 7,103,619 | B1* | 9/2006 | Rajpurkar et al. | 707/204 |
| 7,133,868 | B1* | 11/2006 | Ruest et al. | 707/5 |
| 7,143,105 | B2* | 11/2006 | Nakano et al. | 707/102 |
| 7,269,583 | B2* | 9/2007 | Kapitanski et al. | 707/1 |
| 7,299,216 | B1* | 11/2007 | Liang et al. | 707/1 |
| 7,310,650 | B1* | 12/2007 | Felsted et al. | 707/103 R |
| 7,313,560 | B2* | 12/2007 | Dilley et al. | 707/100 |
| 7,313,576 | B2* | 12/2007 | Clark et al. | 707/203 |
| 7,315,977 | B2* | 1/2008 | Cox et al. | 715/253 |
| 7,346,627 | B2* | 3/2008 | Ramanathan et al. | 707/103 R |
| 7,356,496 | B2* | 4/2008 | Kane et al. | 705/30 |
| 7,356,816 | B2* | 4/2008 | Goodman et al. | 717/172 |
| 7,373,600 | B2* | 5/2008 | Lee et al. | 715/234 |
| 7,403,901 | B1* | 7/2008 | Carley et al. | 705/2 |
| 7,437,675 | B2* | 10/2008 | Casati et al. | 715/736 |
| 7,483,757 | B2* | 1/2009 | Kishore et al. | 700/87 |
| 2002/0091672 | A1* | 7/2002 | Vos et al. | 707/1 |
| 2002/0091708 | A1* | 7/2002 | Vos et al. | 707/104.1 |
| 2003/0039148 | A1* | 2/2003 | Riedle | 365/189.08 |
| 2003/0061358 | A1* | 3/2003 | Piazza et al. | 709/227 |
| 2003/0115195 | A1* | 6/2003 | Fogel et al. | 707/3 |
| 2003/0140041 | A1* | 7/2003 | Rosensteel et al. | 707/10 |
| 2003/0140272 | A1* | 7/2003 | Lawrance et al. | 714/13 |
| 2003/0187853 | A1* | 10/2003 | Hensley et al. | 707/10 |
| 2004/0039809 | A1* | 2/2004 | Ranous et al. | 709/223 |
| 2004/0068501 | A1* | 4/2004 | McGoveran | 707/8 |
| 2004/0138933 | A1* | 7/2004 | LaComb et al. | 705/7 |
| 2004/0162844 | A1* | 8/2004 | Thome et al. | 707/102 |
| 2005/0187991 | A1* | 8/2005 | Wilms et al. | 707/204 |
| 2005/0195660 | A1* | 9/2005 | Kavuri et al. | 365/189.05 |
| 2005/0222931 | A1* | 10/2005 | Mamou et al. | 705/35 |
| 2005/0223109 | A1* | 10/2005 | Mamou et al. | 709/232 |
| 2005/0226059 | A1* | 10/2005 | Kavuri et al. | 365/189.05 |
| 2005/0228808 | A1* | 10/2005 | Mamou et al. | 707/100 |
| 2005/0232046 | A1* | 10/2005 | Mamou et al. | 365/220 |
| 2005/0235274 | A1* | 10/2005 | Mamou et al. | 717/136 |
| 2005/0240592 | A1* | 10/2005 | Mamou et al. | 707/9 |
| 2005/0262188 | A1* | 11/2005 | Mamou et al. | 709/203 |
| 2005/0262189 | A1* | 11/2005 | Mamou et al. | 709/203 |
| 2005/0262190 | A1* | 11/2005 | Mamou et al. | 709/203 |
| 2005/0262191 | A1* | 11/2005 | Mamou et al. | 709/203 |
| 2005/0262193 | A1* | 11/2005 | Mamou et al. | 709/203 |
| 2005/0262194 | A1* | 11/2005 | Mamou et al. | 709/203 |
| 2006/0095666 | A1* | 5/2006 | Furuhashi et al. | 711/114 |
| 2006/0129769 | A1* | 6/2006 | Chen et al. | 711/162 |
| 2007/0103984 | A1* | 5/2007 | Kavuri et al. | 365/185.17 |
| 2007/0174185 | A1* | 7/2007 | McGoveran | 705/39 |
| 2007/0297349 | A1* | 12/2007 | Arkin | 370/255 |
| 2008/0140473 | A1* | 6/2008 | Taylor | 705/7 |
| 2008/0307221 | A1* | 12/2008 | Horita et al. | 713/156 |

OTHER PUBLICATIONS

Wayne Eckerson and Colin White, Evaluating ETL and Data Integration Platforms, TDWI Report Series, 2003.*
Gary Mehler, Next Generation Data Warehousing with SAS 9, May 2004, http://www2.sas.com/proceedings/sugi29/toc.html.*
Notification of Transmittal of International Search Report and Written Opinion for International Application No. PCT/US06/08520.

* cited by examiner

APPARATUS AND METHOD FOR DYNAMICALLY AUDITING DATA MIGRATION TO PRODUCE METADATA

BRIEF DESCRIPTION OF THE INVENTION

This invention relates generally to information processing. More particularly, this invention relates to dynamically auditing data migration, such as in an Extract Transform Load (ETL) system, to produce metadata.

BACKGROUND OF THE INVENTION

The process of migrating data from a source (e.g., a database) to a target (e.g., another database, a data mart or a data warehouse) is sometimes referred to as Extract, Transform and Load, or the acronym ETL. Existing ETL techniques focus on comparing data at a source with data transported to a target to confirm correspondence between the source and target. In other words, after the data has been transported a static comparison is made between the source data and the target data. A typical static comparison involves comparing database row counts at a source and target. Static information of this type is useful, but it would be desirable to provide more sophisticated auditing functions. In particular, it would be desirable to provide information on the actual values of the data instead of simply characterizing the organization of the data. More particularly, it would be desirable to provide information on the values of transported data while the data is transported.

Current ETL systems provide rudimentary forms of data characterization, such as checksum comparisons. These tools fail to provide robust information on the actual content of the transported data. Another shortcoming with these basic forms of data characterization is that they are not customizable.

It would be desirable to improve upon existing techniques that statically audit the results of data movement or that provide limited information on the nature of the content of the transported data. In particular, it would be desirable to provide a technique for auditing the content of dynamic data movement and produce information on that data movement in the form of metadata. Ideally, the metadata could be used for data validation and for the application of customized rules. Any such system should facilitate end-user customization.

SUMMARY OF THE INVENTION

The invention includes a computer readable medium with executable instructions to audit data migration. The executable instructions include instructions to define a data migration path from a source to a target. Audit points are specified within the data migration path. Audit statistics to be generated at the audit points are identified. The audit statistics include data corresponding to individual data values transmitted over the data migration path. Audit rules to be applied against the audit statistics are established.

The invention also includes executable instructions to identify audit points within a data migration path. Audit points are displayed to a user. Specified audit statistics are established for the audit points. User input for audit rules applied to the audit statistics is accepted. Data flow within the data migration path is then processed. Dynamic audit statistics corresponding to the specified audit statistics are collected from the data flow. The audit statistics are saved as metadata. Optionally, audit rules are applied to the audit statistics. The results of the audit rules are saved as metadata.

The invention offers highly configurable auditing of the data transformation process. The user is able to specify different audit functions through different data transformation objects. The invention also supports the application of advanced rules to statistics gathered during data movement. The invention enables users to define, apply, and reuse custom rules across multiple data flows or multiple workflows. This can be done using a GUI, and does not require extensive custom programming.

Rather than creating logging for the audits, the invention creates metadata during the data transformation process to describe the audit point audit function values. The advantage of this approach is that it not only provides a method of monitoring data during the data transformation process, but also the ability (based on rules) to have a real-time outcome from the metadata.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
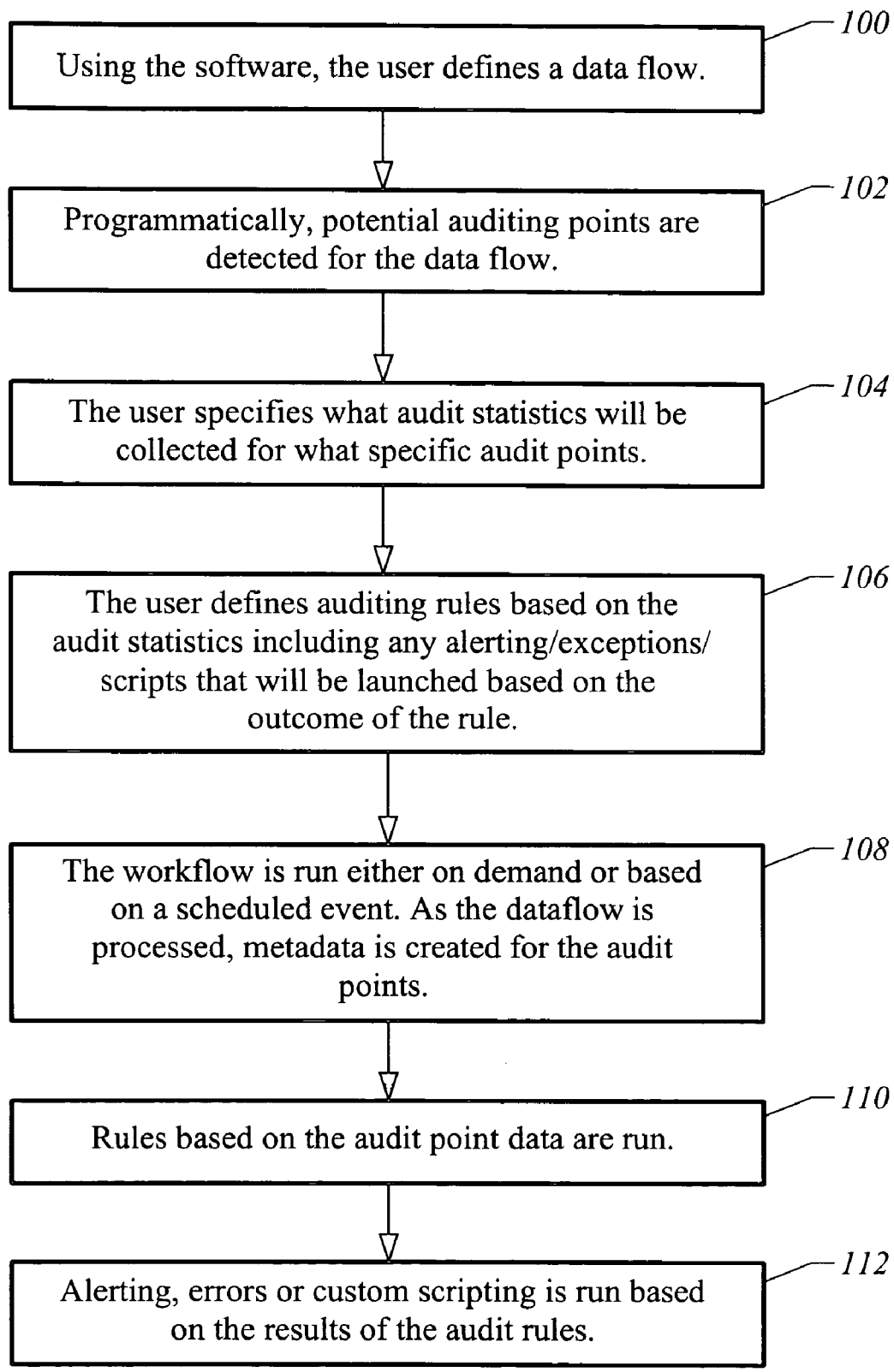
FIG. 1 illustrates general processing operations associated with an embodiment of the invention.

The following terminology is used while disclosing embodiments of the invention:

ETL is an acronym for extract, transform and load. ETL describes software tools that combine these functions to migrate data. For example, the migration may be from one database to another database or to a data mart or data warehouse. ETL is a specific data transformation process. Extracting refers to the process of reading the data from a source (e.g., a database). Transforming is the process of converting the extracted data from its previous form into the form it needs to be in and cleansing it so that it can be placed in the target (e.g., a new database, data mart, or data warehouse). Transformation occurs by using rules or lookup tables or by combining the data with other data. Loading is the process of writing the data into the target.

Data Transformation is used to describe a process that includes all or a portion of standard "ETL" type data processing.

A Data Flow is a reusable object containing steps to define the transformation of data from source to target. Data flows are called from inside a work flow or job. Information can be passed into or out of data flows using parameters.

An Embedded Data Flow is a data flow created within one or more data flows.

A Work Flow is a reusable object containing steps to define the order of job execution. Work flows call data flows, but cannot manipulate data. Work flows are called from inside other work flows or jobs. Information is passed into or out of work flows using parameters. In one embodiment, work flows are reused by dragging existing work flows from an object library.

A Job is the unit of work that can be scheduled independently for execution by the Administrator. Jobs are special work flows that can be scheduled for execution, but cannot be called by other work flows or jobs.

Auditing is the process of collecting aggregate information for the data that is flowing through the job during the job execution and validating the Audit Statistics with user defined rules. The aggregate data is collected as part of job execution.

An Audit Point is the object inside the Data Flow where the audit statistics can be collected. In one embodiment, Audit Points include readers, transforms, and loaders. These points within embedded data flows are also auditable.

Audit Statistics are the audit data collected on a data transformation process job such as COUNT of rows, SUM/AVG, or CHECKSUM on a column. Auditing statistics are stored as metadata for the main data being processed and can be used to validate and compare versions of the data.

An Audit Rule is a Boolean expression that is constructed using among other things audit statistics to verify the Data Integrator job. In addition to audit statistics, audit rules can be based on custom formulas or a combination of audit statistics and custom formulas.

A Connector is a line that connects any two objects within a data flow, which indicates flow of data between objects.

Metadata is information about information. Metadata typically constitutes a subset or representative values of a larger data set. In the present invention, metadata is typically in the form of audit statistics. Metadata associated with the invention provides real time feedback on data migration.

Data Integrator Designer is the preferred embodiment of a graphical user interface (GUI) tool that enables the user to select audit points, define the audit statistics to be collected, and define simple and complex audit rules. Auditing is only one feature of the Data Integrator Designer. Data Integrator Designer provides a GUI development environment to define data application logic to extract, transform, and load data from databases and applications into a data warehouse used for analytical and on-demand queries.

FIG. 1 illustrates processing operations associated with an embodiment of the invention. Initially, software is used to define a data flow 100. In one embodiment, the user defines a data transformation data flow specifying the logic that will be used to extract, transform, and load data from a source to a target. The movement of data from a source to a target is sometimes referred to herein as a data migration path.

Potential auditing points for the data flow are then programmatically detected 102. In various embodiments of the invention, audit points include readers, transforms, and loaders within a parent data flow as well as these points within embedded data flows. The audit points may be automatically selected or they may be selected relying upon user feedback.

The user then specifies audit statistics to be collected for specific audit points 104. Based on auditing needs, users can establish audit points within the data flow. For the selected audit points, users can select one or more audit functions or statistics (e.g., COUNT, SUM, AVG, ERROR_COUNT, and CHECKSUM) to apply at the audit point.

The user then defines auditing rules based on the audit statistics, including any alerting, exceptions, or scripts that will be launched based upon the outcome of the rule 106. For example, audit rules can either be simple comparison rules based on the form Left Hand Side (LHS)=Right Hand Side (RHS) where the user picks the LHS or RHS value from drop down lists. Alternately, more complex rules are invoked, such as those created using an expression editor, which produces custom functions and defines more complex rules.

The workflow is then executed, either on demand or based on a scheduled event. As the dataflow is processed, metadata is created for the audit points 108. In other words, the audit data (audit statistics, metadata) is collected as the data flows. In one embodiment, the metadata is stored in the repository in two tables. One table has the information for each dataflow execution and the other table has specific information for each of the audit points.

At this point, rules based on the audit point data are executed 110. Preferably, metadata is stored for any rules that fail.

Finally, alerting, errors or custom scripts are run based on the results of the audit rules 112. For example, based on the results of the rules and the preferences specified when the rules were created, email alerts may be sent, exceptions thrown, or custom scripts launched.

Figure 2:
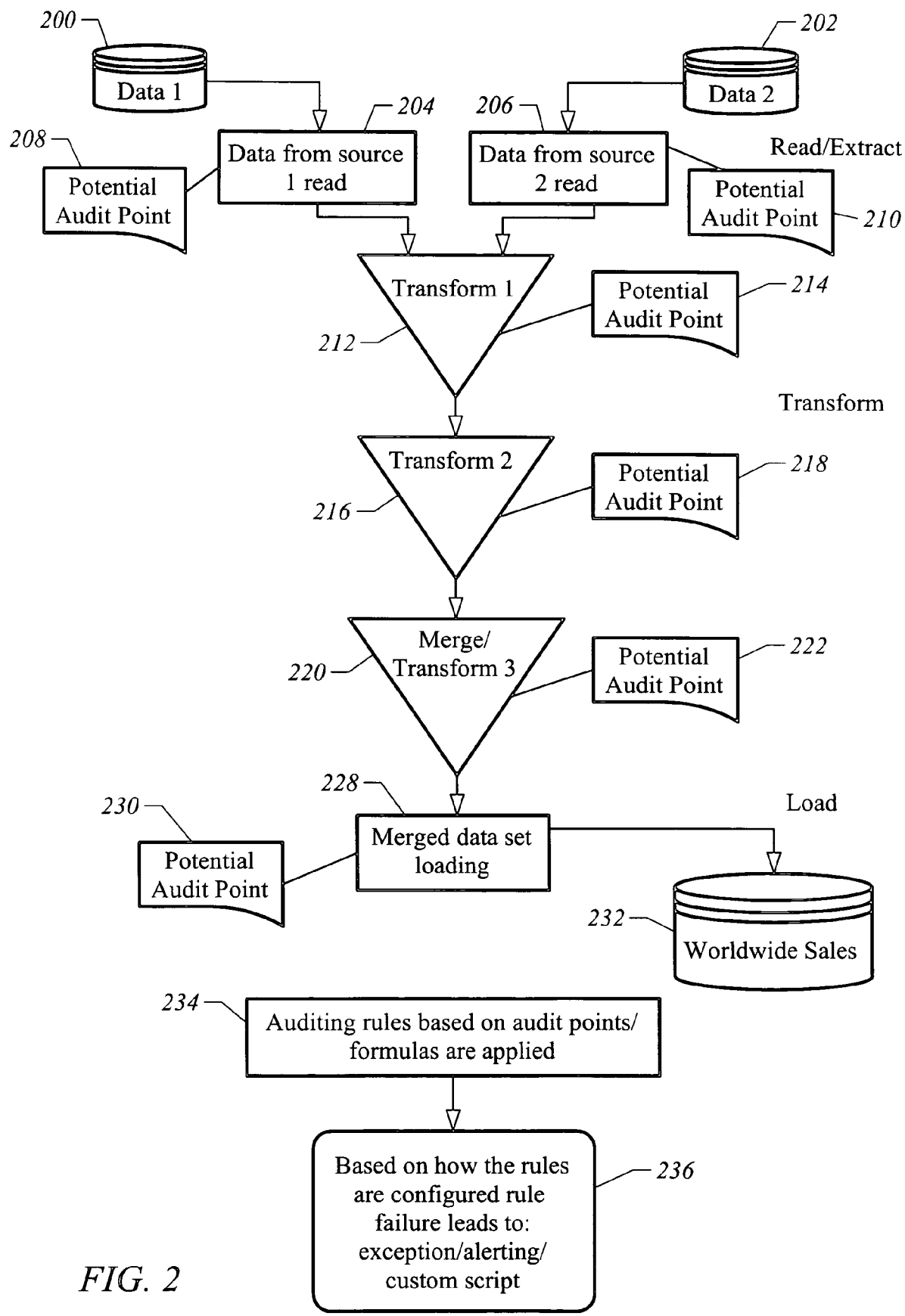
FIG. 2 illustrates processing operations associated with one example implementation of the invention.

The operations associated with an embodiment of the invention are more fully appreciated with reference to FIG. 2. FIG. 2 illustrates a first data source 200 and a second data source 202. A block of data is read from the first data source 200, as shown with box 204. The block of data that is read represents a potential audit point 208. Similarly, a block of data is read from the second data source 202, as shown with box 206. The block of data from the second data source represents a potential audit point 210. The foregoing operations are associated with a read or extraction process.

Transformation operations are then performed on the read data. In particular, a first transform is performed at transformation block 212, which has a corresponding potential audit point 214. In addition, a second transform is performed at transformation block 216, which has a corresponding potential audit point 218. A transform in the form of a merge is then performed at transformation block 220, which also has a corresponding potential audit point 222.

The merged data is then loaded 228. This loading point represents a potential audit point 230. In this example, the merged data is in the form of data representing worldwide sales 232.

During this processing or after this processing, auditing rules based on the specified audit points are applied 234. Based upon the rule execution, exceptions may be thrown, alerts may be issued, or custom scripts may be executed. This process is more fully characterized in connection with FIG. 3.

Figure 3:
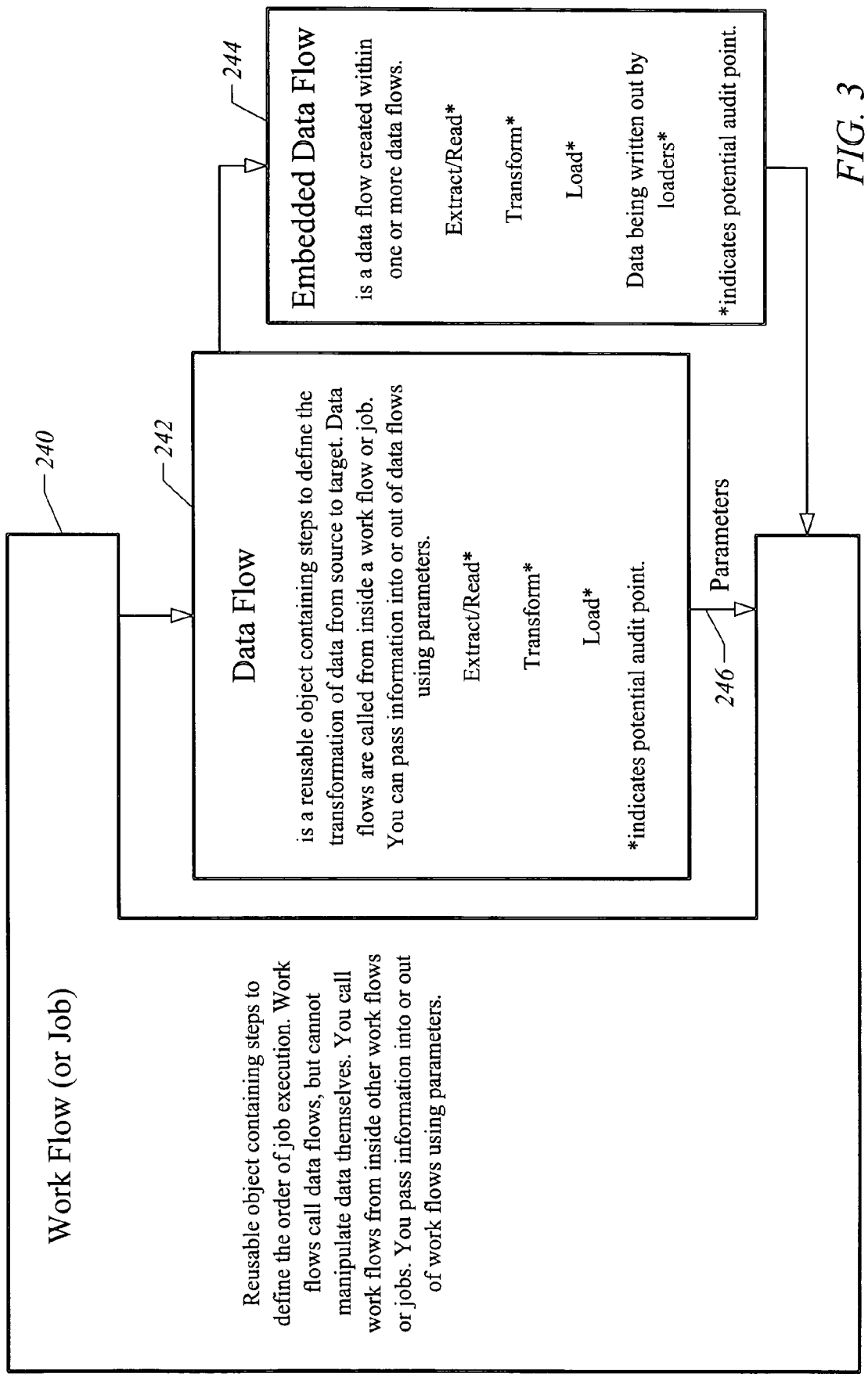
FIG. 3 illustrates the relationship between work flow, data flow, and embedded data flow associated with an embodiment of the invention.

FIG. 3 illustrates that a work flow 240 calls one or more data flows 242. Within the data flow 242, the data is processed. Potential audit points exist within the data flow. If the data flow 242 has a dependency on an embedded data flow 244, it will pass parameters back to the workflow 240, as shown with arrow 246. Within the embedded data flow 244 the data is processed. Potential audit points exist within the data flow. There can be additional embedded data flows. When the data flow 242 and any embedded data flows 244 have been processed, they pass parameters back to the workflow 240, including audit statistics. The workflow 240 runs any auditing rules that it contains. Based on the rules and the failure of the rules, the workflow throws exceptions, sends email alerts, or launches custom scripts.

In one embodiment, the work flow 240 is a reusable object containing steps to define the order of job execution. Work flows call data flows 242, but cannot manipulate data themselves. Work flows can be called from inside other work flows or jobs (where jobs are a special form of workflow and cannot be called from other jobs or workflows). Information is passed into or out of work flows using parameters.

In one embodiment, the data flow 242 is a reusable object containing executable instructions to define the transformation of data from source to target. Data flows are called from inside a work flow or job. One can pass information into or out of data flows using parameters. Data processing typically defined within a data flow includes: extract/read, transform, and load. Each of these processes is a potential auditing point where statistics can be gathered. If the data flow 242 has a dependency on an embedded data flow 244, it will pass a parameter to the workflow 240, which will call the embedded data flow 244. The embedded data flow 244 has the same characteristics as the data flow 242.

The invention is more fully appreciated in connection with a specific example.

Company X has its data stored in many different locations and applications. For example, there might be a separate data source for North American Sales and a separate data source for European Sales that need to be combined into a single data source for Worldwide Sales. There are some differences between how the data is identified in the North American Sales and European Sales data sources so Company X has been using a data transformation process solution to standardize the data.

Using auditing, Company X realizes that it can create a simple rule to confirm that the amount of data (number of rows) read from North American Sales plus the amount of data read from European Sales is equal to the amount of data found in the final output. All of the corporate reports are based upon the final Worldwide Sales data source so it is critical that the Worldwide Sales data source is not missing any information contained in either of the data sources that it is based on. In this simple case, the data transformation process data flow can be characterized as: two readers→cleansing transform→merge transform→loader to move the data into a target. Specifically, the data flow would have one reader each for North American Sales and European Sales, a cleansing transform to standardize the data, a merge transform to merge the data from the two sources, and a loader to move the consolidated data into the final output database. In this example, the data read from the readers can be audited and checked to confirm that correct data is loaded. To do this, a count is collected at three audit points: From reader1→merge, and reader2→merge and from the loader. In other words, in this example, audit points would be added at three points.

As data is read from North American Sales into the transform stage, the number of rows of data moving into the merge would be audited. Similarly, as the data is read from European Sales into the transform stage the number of rows of data moving into the merge would be audited. Finally, the third audit would occur after the data from North American Sales has been merged (and any transformations have taken place) as the combined data is loaded into the output Worldwide Sales database.

Figure 4:
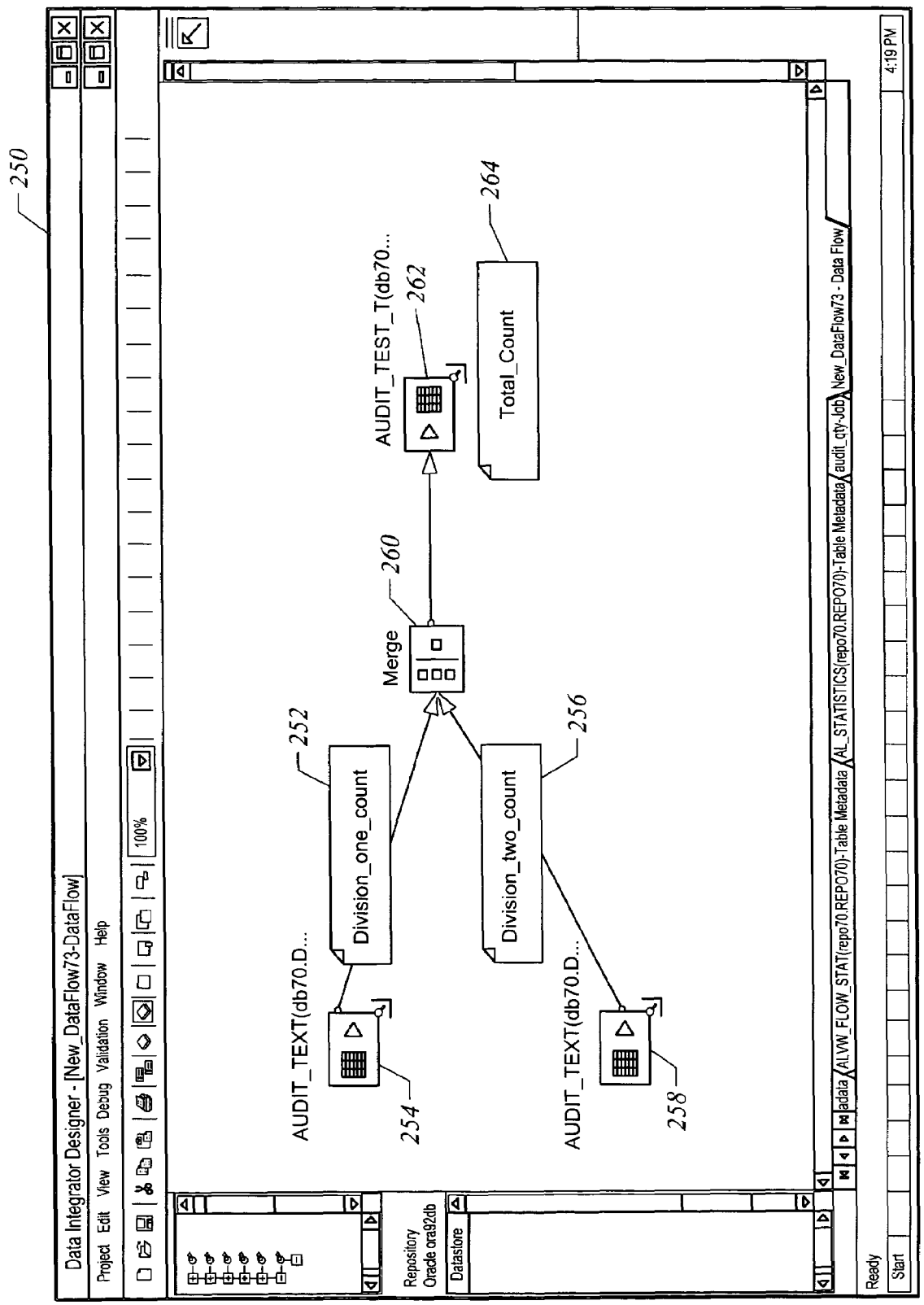
FIG. 4 illustrates a user interface that may be utilized in accordance with an embodiment of the invention.

To verify that correct data is loaded, the user may define the following audit rule:

Division_one_count+Division_two_count=Total_count. Or more specifically: NorthAmericanSales_count+EuropeanSales_count=WorldwideSales_count FIG. 4 illustrates a graphical user interface 250 that may be used to implement this functionality. FIG. 4 illustrates the construction of a rule (Division_one_count+Division_two_count=Total_count or specifically NorthAmericanSales_count+EuropeanSales_count=WorldwideSales_count). In particular, the figure illustrates a Division_one_count block 252 receiving data from a source 254 and a Division_two_count block 256 receiving data from a source 258. The data is merged at a merge block 260 to produce a results block 262, which is subject to a Total_Count operation with block 264.

Each of the items of FIG. 4 may be selected from pull-down menus and/or other functional graphical elements. Standard drag and drop operations may be used to construct the rule. In addition, the interface allows a user to specify an exception (e.g., the process failed), an alert (e.g., an email notification), or the launching of a custom script based on the rule result. In this example, if the total number of rows copied from North American Sales and European Sales does not equal the total number of rows in the final data being output and loaded into the Worldwide Sales, it is important that notification be sent to the information technology department to allow investigation of the problem and to insure that the inaccurate data is not used. For example, if the above rule fails, an email notification (e.g., it@companyx.com) may be sent.

Figure 5:
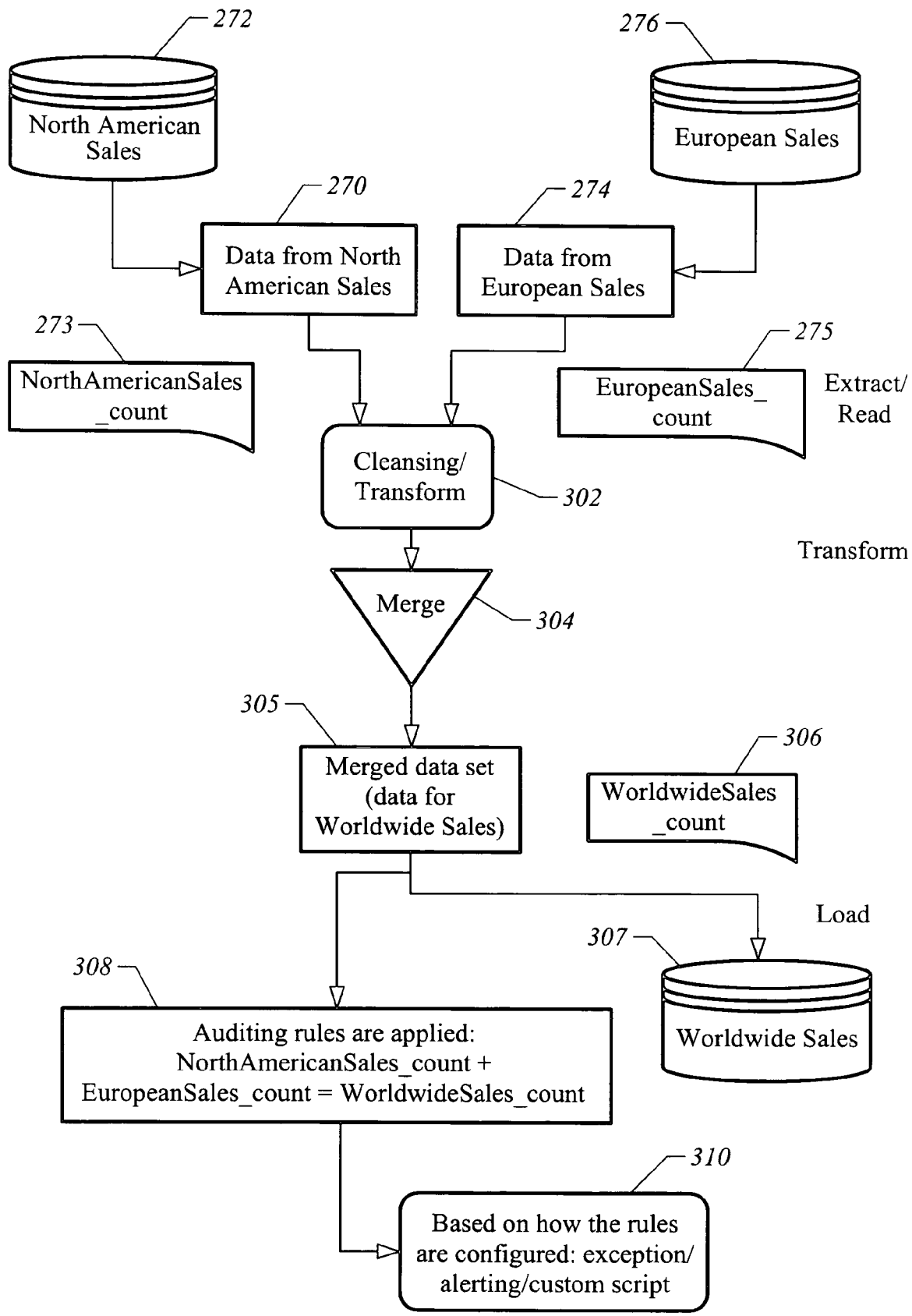
FIG. 5 illustrates processing operations associated with an exemplary implementation of the invention.

FIG. 5 illustrates the processing associated with the rule constructed in FIG. 4. Data from North American sales 270 are extracted from database 272. An audit point 273 tracks a North American Sales Count. Similarly, Data from European Sales 274 are extracted from database 276. An audit point 275 tracks a European Sales Count. The data is then cleansed and/or transformed at block 302 and is then merged at block 304 to produce a merged data set 305. The merged data set, a Worldwide Sales Count 306 is then loaded into a database 307. Auditing rules may then be applied 308. Based upon the results of the auditing rules, exceptions, alerting or custom scripts are launched 310.

This simple example provides an overview of the auditing process. However, it does not reflect the more sophisticated aspects of the invention. The invention enables the user to create advanced complex rules based on audit statistics from very specific points within the data transformation process (including embedded data flows), as demonstrated with the following example.

Consider a conglomerate that merges the payrolls of subsidiary companies and then creates a new database for those employees with a salary≧85,000 and a new database for those employees with a salary<85,000. This scenario uses five audit points to ensure that the final data is accurate.

Figure 6:
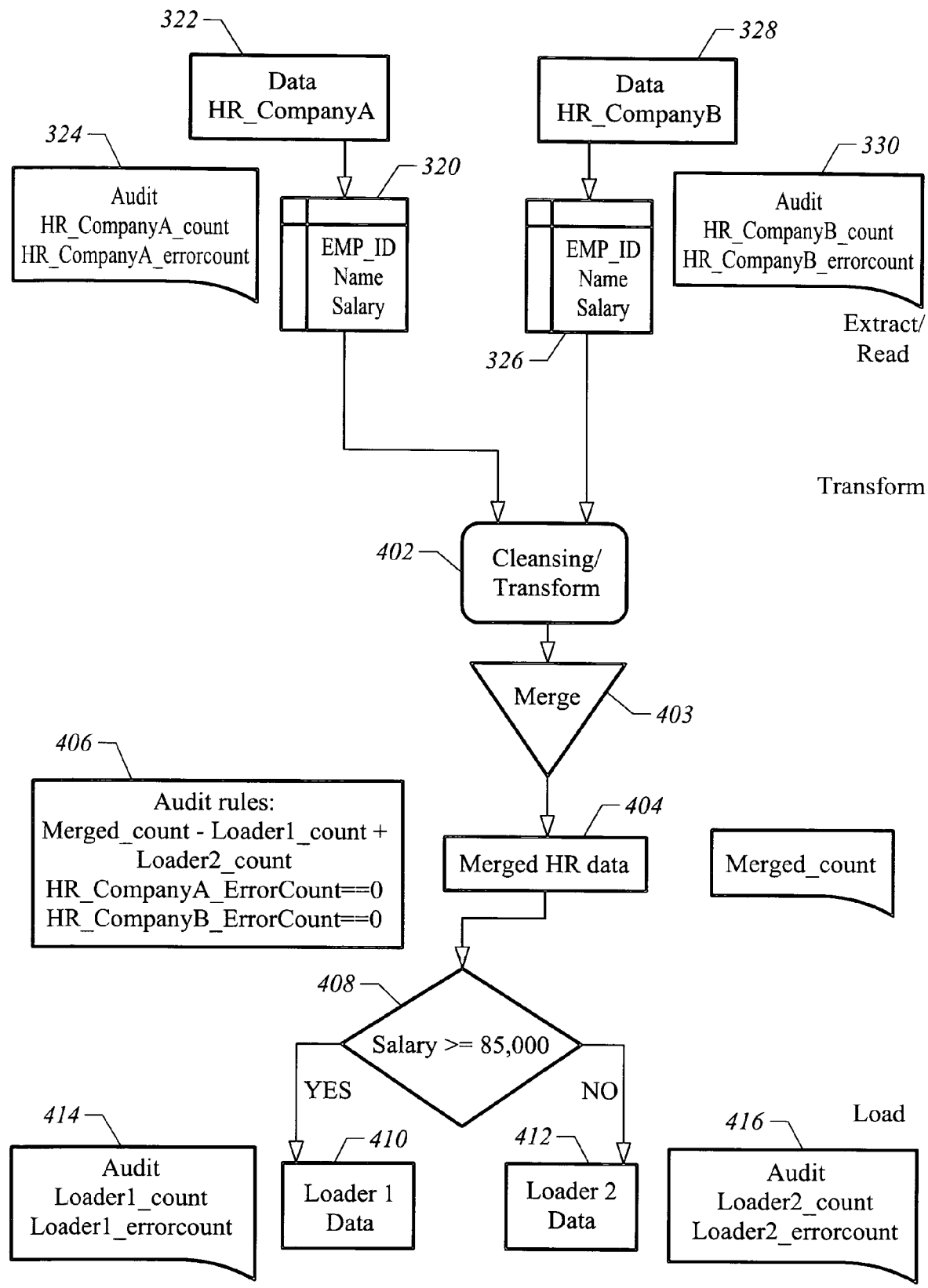
FIG. 6 illustrates processing operations associated with another exemplary implementation of the invention.

FIG. 6 illustrates the extraction of employee ID, name and salary information 320 from a data source 322. An audit point, shown in block 324, tracks a count value and an error count value to form audit statistics. Similarly, employee ID, name and salary information 326 is extracted from data source 328. Audit point 330 tracks information corresponding to the information tracked in block 324. The data is then applied to a cleansing/transform block 402 and a merge block 403 to produce merged HR data 404. At this point, cumulative count and error count audit rules 406 are applied to the generated audit statistics.

A filter 408 is then applied to separate data based on the value of the salary field. This results in the data being loaded into two databases 410 and 412. As the data is loaded, additional values (count and errorcount) are audited at blocks 414 and 416 for each of the two loads. Auditing rules can then be applied to these audit statistics. The rules run against the auditing statistics may be stored as metadata associated with the data. In this case to verify the data, the conglomerate uses the following rules:

a) Merged_count=Loader1_count+Loader2_count b) HR_CompanyA_ErrorCount=0 c) HR_CompanyB_ErrorCount=0

Rule a) confirms that the sum of the rows loaded by Loader 1 and Loader 2 is equal to the count of the merged data or in other words that no data was lost. Rules b) and c) confirm that the original data that was read did not contain bad rows. If one of the rules fails, depending on what was configured for that rule, one or more of the following will occur: an exception is raised, an email notification is sent, or a custom script is launched.

The invention may also be used in connection with auditing specific data values. That is, one of the unique features of the auditing system of the invention is the fact that it can audit actual values within the data as well as measures used to confirm the data integrity. The functions average (AVG) and SUM are based on the actual data values being moved through the data flow, rather than on the validation of the data processing in terms of the numbers of rows or checksums.

Consider the following example. The investment data for two Portfolios (A and B) is stored in two different databases that are then merged into one database. During the process of merging the data, auditing occurs at three points. In order to ensure that the data is correct, a number of rules are created.

In addition to the auditing that is focused on the data validity, there are also auditing statistics collected and auditing rules that pertain to the specific values in the data. For example, a rule specifies that if the sum of the profit for either one of the portfolios is greater, then an action (e-mail alerting) will occur. This enables the manager of the under-performing portfolio to be notified as the results become available in the main database. In addition, there is a rule based on Portfolio A having a value greater than Portfolio B. Given trading restrictions, Portfolio A is never intended to have an overall value greater than Portfolio B. When this occurs an automated script is launched to move funds out of Portfolio A.

Figure 7:
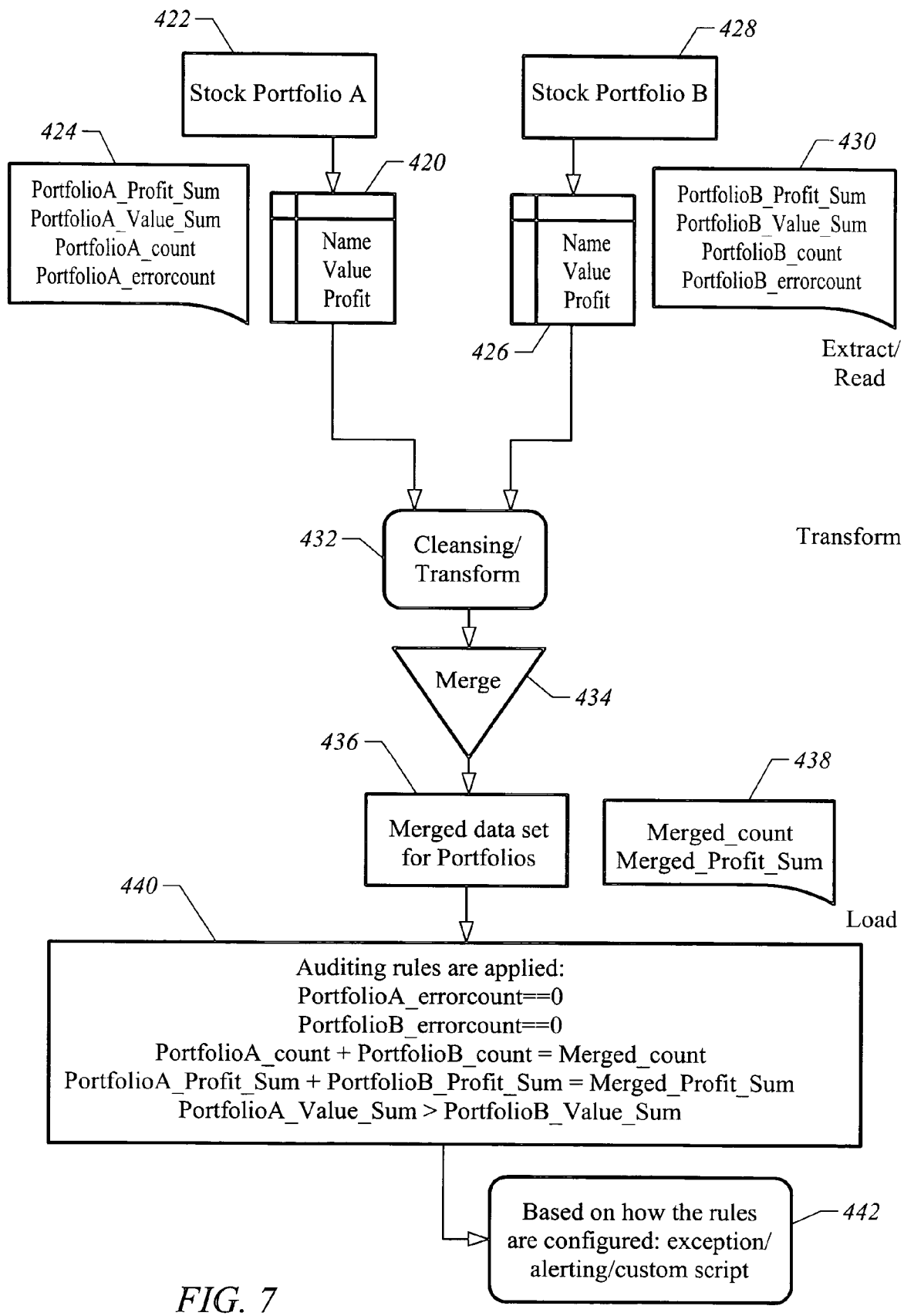
FIG. 7 illustrates processing operations associated with still another exemplary implementation of the invention.

FIG. 7 illustrates processing associated with this example. Name, value and profit data 420 is extracted from stock portfolio A 422. Audit point 424 counts the number of rows and the number of rows that contain errors. In addition to these data verification auditing statistics, calculated auditing statistics that reflect the data content for the flow are also calculated. In this example, the values for Profit and Value are summed. Identical processing is performed in connection with blocks 426, 428, and 430.

Optional data cleansing and data transformations are performed at block 432. The data is then merged at block 434 to produce merged data 436, in particular merged count and merged profit sum data 438. As the merged data is loaded into an output database, the audit rules of block 440 are applied. In this example, the audit rules include:

a) PortfolioA_errorcount=0 b) PortfolioB_errorcount=0 c) PortfolioA_count+
    PortfolioB_count=Merged_count d) PortfolioA_Profit_Sum>PortfolioB_Profit_Sum e) PortfolioA_Profit_Sum<PortfolioB_Profit_Sum f) PortfolioA_Value_Sum>PortfolioB_Value_Sum Optionally, a more complex custom rule based on specific accounting formulas could be defined using the expression editor.

If a rule fails, an exception is raised, an email notification is sent, or a custom script is launched, as shown in block 442. In: this scenario, rules a-c are used to validate that, the data does not contain errors and has not been lost. Rules d-f are used to create alerting based on the actual value contained in the data that is audited. In this case, actions are based on either one of the portfolios having greater profits than the other or Portfolio A having a greater value than portfolio B.

With the data from the two sources being merged, identifying and comparing the values within the original data sources before they are fully combined is important. These audit statistics are also stored as metadata and can provide useful information to determine trends and the like.

In accordance with an embodiment of the invention, audit statistics can be defined inside an embedded data flow. Auditing for embedded data flows is enabled at the level of the parent data flow. From the parent data flow, the user can select the audit points within the embedded data flow. This way, the parent data flow can selectively switch on the audit statistics collected inside the embedded data flow depending on its auditing workflow needs.

Figure 8:
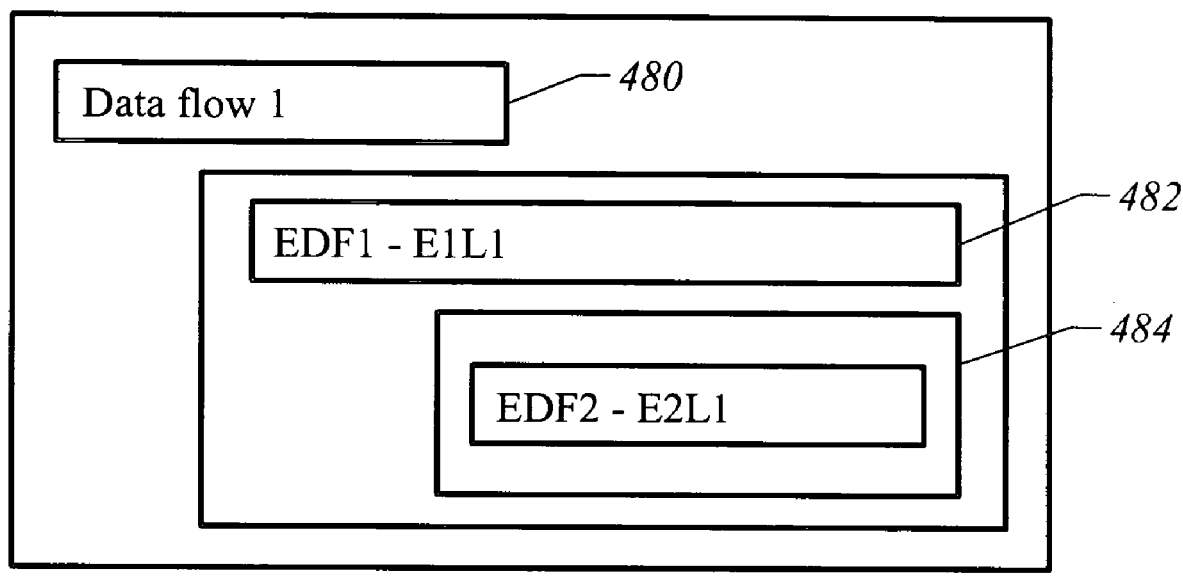
FIG. 8 illustrates embedded data flow operations processed in accordance with an embodiment of the invention.

In one embodiment, a user interface facilitates audit labels of the embedded data flow. For example, as shown in FIG. 8, a first data flow 480 can selectively enable embedded data flow E1L1 482 and E2L1 484.

The invention may also employ run time rules. For example, after some audit points are defined for collecting audit statistics, the user can then define two types of rules that are used at run time. The first type of rule is a simple comparison rule based on the form Left Hand Side (LHS)=Right Hand Side (RHS). The user picks the LHS or RHS value from drop down menus. Note that values in dropdown menus are audit points that already have been defined. The second type of rule lets the user create more complex rules using an expression editor to include custom functions and define more complex rules.

Figure 9:
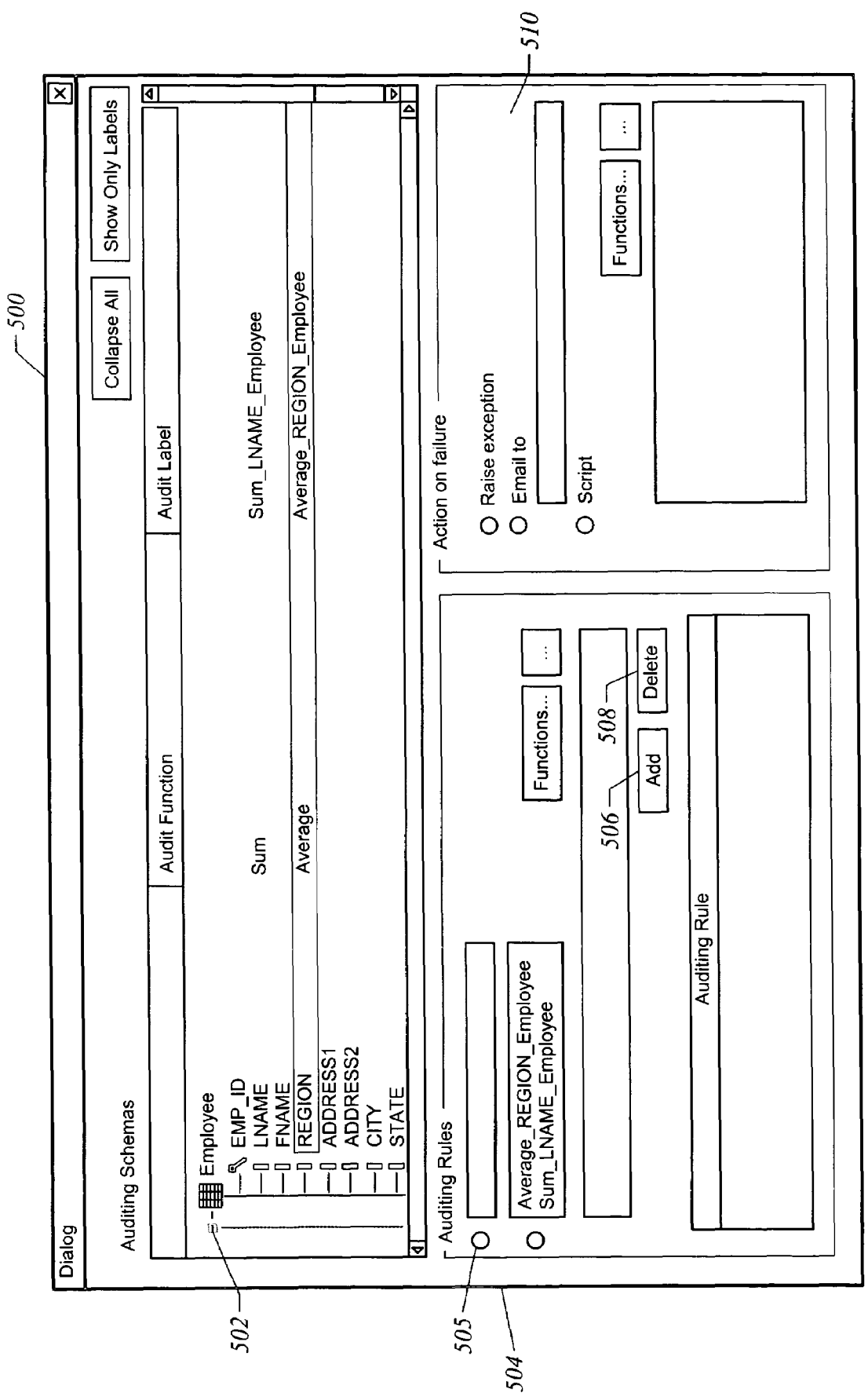
FIG. 9 illustrates a user interface to select auditing functions, auditing rules, and action failure tasks in accordance with an embodiment of the invention.

FIG. 9 illustrates a user interface 500 that may be used in accordance with an embodiment of the invention. Auditing schemes are displayed in a tree 502. Pre-existing auditing rules may also be selected in block 504. In particular, a radio button, such as button 505, may be used to select a rule, while button 506 is used to add the rule. An added rule can then be used to process a current and subsequent data flows. Button 508 allows a rule to be deleted. FIG. 9 also shows a block 510 for specifying actions in the event of a rule failure. The actions may include raising an exception, sending an email, and executing a script.

Figure 10:
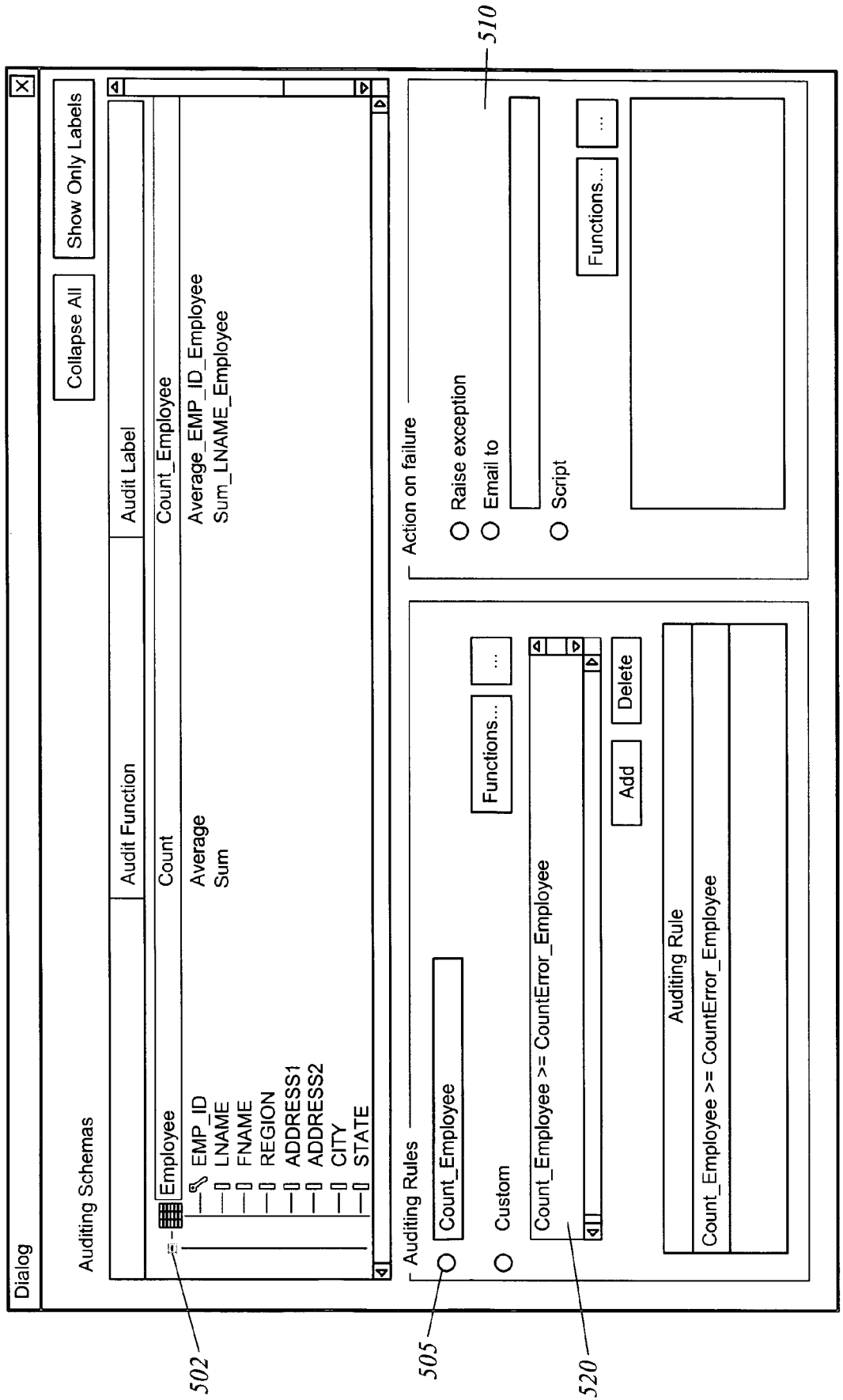
FIG. 10 illustrates a user interface to specify custom auditing rules in accordance with an embodiment of the invention.

As shown in FIG. 10, a user can define more complex rules using an expression editor. In using the expression editor, the user is not restricted to LH=RH type rules, but has the option of constructing complex rules based on other criteria, such as the custom rule illustrated in block 520. FIGS. 9 and 10 illustrate the expanded functionality associated with embodiments of the invention. The figures also show user customization that may be accomplished in accordance with the invention.

Audit functions that may be used in accordance with an embodiment of the invention include:

| Audit Function | Audit Level | Details | Default datatype | Allowed datatypes |
|---|---|---|---|---|
| COUNT | table or rowset | Row count collects good row count. | INT | INT |
| ERROR_COUNT | table or rowset | The count of those rows which are rejected due to an error. | INT | INT |
| CHECKSUM | columns | A computed value which is used to detect data corruption. | VARCHAR(128) | VARCHAR (128) |
| SUM | table or rowset | Based only on Good row count. | Type of the column | INT, DECIMAL, DOUBLE, REAL |
| AVG | table or rowset | Based only on Good row count. | Type of the column | INT, DECIMAL, DOUBLE, REAL |

Audit status information may also be provided, as shown in the table below.

| Audit Status | Description |
|---|---|
| Not Audited | Data flow is not audited. |
| Audit Collected | Audit statistics are collected but no audit rules are defined to verify. |
| Audit Success | Audit statistics are collected and were successfully verified with audit rules. |
| Audit Failure | Audit statistics are collected and the rules failed. If there are multiple rules on a data flow, and only one of the rules fails, it will have an "Audit Failure" status. |

Figure 11:
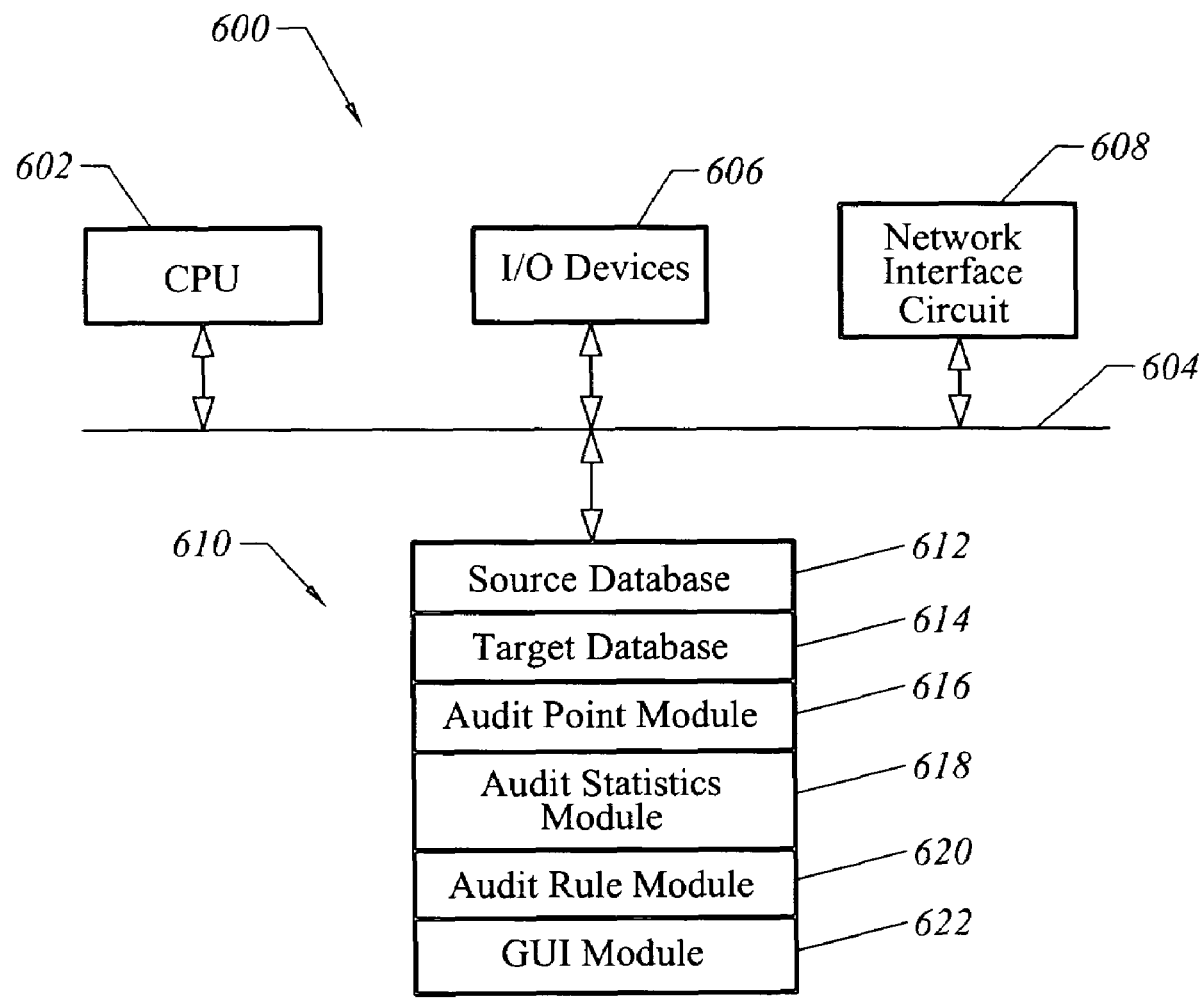
FIG. 11 illustrates a computer configured in accordance with an embodiment of the invention.

FIG. 11 illustrates a computer 600 configured in accordance with an embodiment of the invention. The computer 600 has standard components including a central processing unit 602, a bus 604, input/output devices 606, and a network interface circuit 608. The input/output devices 606 may include a keyboard, mouse, display, printer, and the like. The network interface circuit 608 facilitates communications with networked computers (not shown). The computer 600 also includes a memory 610. The memory 610 includes executable instructions to implement operations of the invention.

In the example of FIG. 11, the memory 610 includes a source database 612 and a target database 614. Naturally, the memory may include multiple source databases 612 and/or target databases 614. In addition, the source and target databases may be on different machines in a networked environment. The configuration of FIG. 11 is simplified for illustrative purposes.

The memory 610 also includes an audit point module 616. The audit point module 616 includes executable instructions to implement audit point insertion operations performed in accordance with embodiments of the invention. The audit point module 616 may be configured to automatically insert audit points at selected locations based upon a set of pre-existing data migration tracking rules. The data migration tracking rules specify reasonable locations for audit points during data extraction, transform and load operations. The audit point module 616 may also be configured to accept user input that specifies audit point locations.

The memory 610 also includes an audit statistics module 618. The audit statistics module 618 includes executable instructions to specify and generate audit statistics. As previously indicated, the audit statistics may include data corresponding to individual data values transmitted between the source database and the target database. The audit statistics may include COUNT, SUM, AVERAGE, CHECK SUM, and ERROR COUNT functions. The audit statistics module 618 may include executable instructions to automatically generate audit statistics, for example based upon the data being migrated. The audit statistics module may also be configured to accept user-specified audit statistics.

An audit rule module 620 is also stored in memory 610. The audit rule module 620 includes executable instructions to invoke and execute audit rules against generated audit statistics. The audit rule module 620 includes executable instructions to generate email alerts, to specify executable scripts, and to raise exceptions in response to process failures.

Memory 610 also stores a graphical user interface (GUI) module 622. GUI module 622 includes executable instructions to display interfaces, such as shown in FIGS. 4, 9 and 10 and to receive input from such interfaces. Thus, the invention provides a GUI-based technique for auditing data migration. A user does not need to write code or access application program interfaces. Instead, the invention provides a simple technique for non-technically trained individuals to dynamically audit data migration.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium including executable instructions to audit data migration, comprising executable instructions to:
    define a data migration path from a source to a target;
    specify audit points within said data migration path;
    identify audit statistics to be generated at said audit points, said audit statistics including data corresponding to individual data values transmitted over said data migration path;
    generate audit statistics at said audit points by collecting aggregate information for values of transported data while said data is transported, said audit statistics forming an embedded data flow separate from said data migration path; and
    establish audit rules to be applied against said audit statistics from said embedded data flow.

2. The computer readable medium of claim 1 wherein said executable instructions to specify audit points include executable instructions to specify audit points at data extraction, transform and load positions.

3. The computer readable medium of claim 1 wherein said executable instructions to specify audit points include executable instructions to allow a user to specify audit points.

4. The computer readable medium of claim 1 wherein said executable instructions to specify audit points include executable instructions to automatically specify audit points.

5. The computer readable medium of claim 1 wherein said executable instructions to identify audit statistics include executable instructions to present selectable audit statistics selected from COUNT, SUM, AVERAGE, CHECK SUM, and ERROR COUNT.

6. The computer readable medium of claim 1 wherein said executable instructions to identify audit statistics include executable instructions to automatically specify audit statistics.

7. The computer readable medium of claim 1 wherein said executable instructions to identify audit statistics include executable instructions to identify metadata audit statistics embedded with data from said source and delivered to said target.

8. The computer readable medium of claim 1 wherein said executable instructions to establish audit rules include executable instructions to specify an audit rule applied to data flow.

9. The computer readable medium of claim 1 wherein said executable instructions to establish audit rules include executable instructions to specify an audit rule applied to an audit point.

10. The computer readable medium of claim 1 wherein said executable instructions to establish audit rules include executable instructions to specify an email alert rule.

11. The computer readable medium of claim 1 wherein said executable instructions to establish audit rules include executable instructions to identify a process failure that raises an exception.

12. The computer readable medium of claim 1 wherein said executable instructions to establish audit rules include executable instructions to specify an executable script.

13. The computer readable medium of claim 1 further comprising executable instructions to initiate data migration on demand.

14. The computer readable medium of claim 1 further comprising executable instructions to initiate data migration in response to a scheduled event.

15. A computer readable medium including executable instructions to audit data migration, comprising executable instructions to:
    identify audit points within a data migration path;
    display the audit points to a user;
    establish specified audit statistics for said audit points;
    accept user input for audit rules applied to said audit statistics;
    process data within said data migration path to produce an embedded data flow separate from said data migration path;
    collect from said embedded data flow dynamic audit statistics corresponding to said specified audit statistics, wherein said dynamic audit statistics include aggregate information for values of transported data while said data is transported;
    save the audit statistics as metadata;
    optionally apply audit rules to said audit statistics; and
    save the results of said audit rules as metadata.

16. The computer readable medium of claim 15 wherein said executable instructions include executable instructions to generate an email alert, to throw an exception in response to a process failure, and to execute a custom script.

17. The computer readable medium of claim 15 further comprising executable instructions to apply audit rules to a data flow and an audit point.

18. The computer readable medium of claim 15 further comprising executable instructions to generate audit statistics selected from COUNT, SUM, AVERAGE, CHECKSUM, and ERROR COUNT operations.

* * * * *